Jan. 26, 1932.    E. DUBOSC    1,842,590
GEAR WHEEL
Filed July 28, 1928
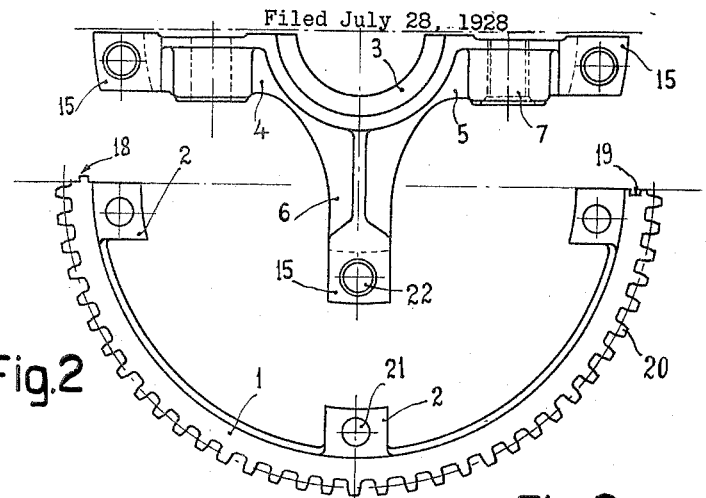
Fig. 1
Fig. 2
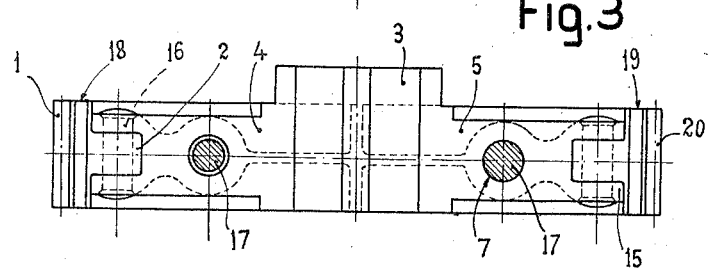
Fig. 3
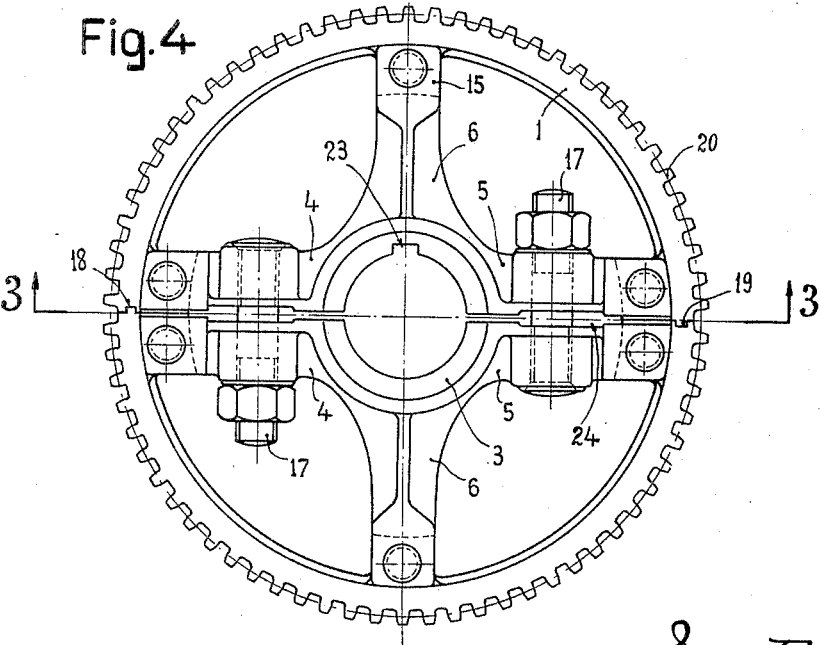
Fig. 4
Inventor:
Edgardo Dubosc,
By Byrnes Townsend & Brickenstein,
Attorneys.

Patented Jan. 26, 1932

1,842,590

UNITED STATES PATENT OFFICE

EDGARDO DUBOSC, OF TURIN, ITALY

GEAR WHEEL

Application filed July 28, 1928, Serial No. 296,002, and in Italy November 3, 1927.

The present invention relates to gear wheels and has for its object a gear wheel consisting of sections adapted to be mounted on a shaft and comprising a toothed rim which is removably mounted on the spoked member of the wheel.

In the wheel according to the present invention said toothed rim consists of at least two sections which are removable with respect to the spoked member of the wheel for the purposes of substitution, repairs and the like.

On the annexed drawings is shown by way of example an embodiment of this invention and Figure 1 is a side view of one of the wheel spoked members;

Figure 2 is a side view of a toothed rim section adapted for cooperation with the spoked member of Fig. 1;

Figure 3 is a section of the wheel on line 3—3 of Fig. 4;

Figure 4 is a side view of a complete wheel.

As shown in the drawings, the wheel comprises a toothed rim divided in two sections 1—1 each rim section having peripheral outer teeth 20 and inwardly projecting attaching means 2 as hereinafter described; said rim sections 1—1 are provided in their end and abutting faces with cooperating grooves 18 and ribs 19 adapted to engage each other for correctly positioning said rim sections.

The spoked member of the wheel is also divided in two sections each comprising a hub section 3 and radial spokes 4—5—6; in each section said spokes are arranged radially at 90° to each other and the aligned ones of said spokes have bolt holes 7 intended to receive bolts 17 for the purpose of interconnecting the sections of spoked members around the shaft axis and clamping them thereon as shown in Figure 4.

For assembly of rim sections 1 on the spoked members 3—4—5—6, said rim sections 1 have inwardly projecting lugs 2 lying in the middle plane of the rim, and spokes 4—5—6 have end forks or seats 15 adapted to be entered by lugs 2; said lugs 2 and forks 15 have holes 21—22 close to rim 1 and having their axes parallel with the axis of hub 3 for insertion of rivets 16 or other fastening members intended to interconnect the rims sections with spoked members.

One of the hub members 3 is provided with a key way or cotter seat 23 intended to receive a cotter or key for making the wheel solid with shaft (not shown) intended to carry it.

Recessed portions 24 are provided in the opposite surfaces of spokes 4—5 of the two sections, to provide for tightening bolts 17.

For use each rim section 1, 1 is clamped on the associate spoke section 4—5—6 by introducing lugs 2 in forks 15 and then rivets 16 are inserted in registering holes 21—22 and fastened in position by riveting their heads or ends; thereafter the two wheel sections are located in position of the shaft with ribs and grooves 18—19 in engagement with each other and bolts 17 are tightened.

To replace the rim sections or any of them when worn out, bolts 17 are released and wheel sections are removed from shaft and then rivets 16 are removed or destroyed say by a drill; the rim section 1 is removed from cooperating spoked member 4—5—6 and a fresh rim section is located in position and rivets 16 are inserted and riveted in position.

The provision of holes 21—22 parallel with the axis of the wheel ensures an easy insertion of rivets 16 in the wheel parts in close proximity with the rim 1, this feature making the wheel very resistant and the assembly of parts easy.

The described arrangement has further the advantage that each spoked member when provided with its toothed rim section provides a separate unitary portion of the wheel and thus the wheel may be removed from its shaft merely by releasing bolts 17 without having to remove each toothed rim section from the associate spoked members.

Of course the above described construction is given merely by way of example and any equivalent arrangement within the limits of appended claim may be used instead of the described one for the purpose of fastening the rim sections on the spoke sections and the wheel sections on a shaft.

What I claim as my invention and desire to secure by United States Letters Patent is:—

In a split gear wheel, in combination, a plurality of toothed rim sections, each having a plurality of spaced, inwardly projecting, perforated lugs, a spoked member for each rim section comprising a plurality of spokes having forked, perforated ends engaging said lugs with the perforations registering with the perforations in said lugs, certain of said spokes of different spoked members being disposed adjacent and substantially parallel and having oppositely facing offset portions provided with cooperating perforations, clamping members extending through said last-named perforations for drawing said offset portions together, and rivet-headed pins disposed in said registering perforations in said spokes and said lugs and having a forced fit therein to secure said rim sections to their respective spoked members.

In testimony whereof I affix my signature.

EDGARDO DUBOSC.